US007536184B2

(12) United States Patent
Poczo (10) Patent No.: US 7,536,184 B2
(45) Date of Patent: May 19, 2009

(54) SEAMLESS MOBILITY MANAGEMENT WITH SERVICE DETAIL RECORDS

(75) Inventor: Gabriella R. Poczo, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 498 days.

(21) Appl. No.: 11/312,199

(22) Filed: Dec. 20, 2005

(65) Prior Publication Data

US 2007/0072605 A1    Mar. 29, 2007

Related U.S. Application Data (60) Provisional application No. 60/721,664, filed on Sep. 29, 2005.

(51) Int. Cl.
*H04W 4/00*    (2006.01)
(52) U.S. Cl. .................................. 455/432.3; 455/433
(58) Field of Classification Search .............. 455/432.1, 455/432.2, 432.3, 433
See application file for complete search history.

(56) References Cited

U.S. PATENT DOCUMENTS

| 5,497,412 | A | * | 3/1996 | Lannen et al. ........... 455/432.2 |
| 6,122,510 | A | * | 9/2000 | Granberg .................... 455/433 |
| 2001/0025280 | A1 | | 9/2001 | Mandato et al. |
| 2004/0067754 | A1 | | 4/2004 | Gao et al. |
| 2004/0114615 | A1 | | 6/2004 | Virtanen et al. |
| 2004/0233866 | A1 | | 11/2004 | Bossoli et al. |
| 2005/0130659 | A1 | | 6/2005 | Grech et al. |
| 2005/0215254 | A1 | | 9/2005 | Pedersen et al. |
| 2005/0250468 | A1 | | 11/2005 | Lu et al. |
| 2005/0265279 | A1 | | 12/2005 | Markovic et al. |
| 2005/0286466 | A1 | | 12/2005 | Tagg et al. |

OTHER PUBLICATIONS

Poczo, Gabriella, "Converged Network Services: The Big Bets", Sun Microsystems, Inc., Telecom, Sep. 2004, pp. 1-11.

* cited by examiner

*Primary Examiner*—Nick Corsaro
*Assistant Examiner*—Shannon R Brooks
(74) *Attorney, Agent, or Firm*—Marsh Fischmann & Breyfogle LLP; Kent A. Lembke (57) ABSTRACT

A method for enhancing mobility of a subscriber in a telecommunications environment. The method includes deploying with a first network operator a service that is accessible by a subscriber via a first network. The method continues with creating a service detail record containing information related to an identity of the service, e.g., defining the service. The method then involves publishing the service detail record in a service registry that is accessible by a second network operator operating a second network. The second network operator receives over the second network a request from the subscriber for the service and in response, processes the service detail record and based on such processing provides the service to the subscriber via the second network. To provide the services, the service is executed on the first network using resources of the first network allocated to the service, such as by the service detail record.

10 Claims, 7 Drawing Sheets

SEAMLESS MOBILITY MANAGEMENT WITH SERVICE DETAIL RECORDS

CROSS-REFERENCE TO RELATED APPLICATIONS

This application claims the benefit of U.S. Provisional Application No. 60/721,664, filed Sep. 29, 2005, which is incorporated herein by reference.

BACKGROUND OF THE INVENTION

1. Field of the Invention

The present invention relates, in general, to providing services to subscribers across multiple networks, such as wireless networks, in a seamless fashion, and, more particularly, to software, systems, and methods for facilitating mobility of subscribers or users by facilitating seamless mobility of services across two or more networks or two or more service provider systems or networks (i.e., facilitate a mobile subscriber to access the same or similar service regardless of which communication network they are accessing with a mobile device).

2. Relevant Background

In the computer and communications industries, demand is rapidly growing for pervasive computing that allows people ubiquitous or ongoing access to information and services through the use of portable computers and communication devices such as cellular and wireless phones, personal digital assistants (PDAs), and the like through wired and wireless networking. Today people more and more demand to be "always on" or "always connected" which is increasingly more possible due to the growing availability and ubiquity of different types of access networks that are creating a "network of networks" made up of heterogeneous network components and technologies. Subscribers to services, such as email and scheduling programs, want to be able to connect to a network anytime and anywhere without having to think about the background technology used for providing and maintaining connectivity.

Mobility and, particularly, seamless mobility is becoming the underlying foundation of today's ubiquitous networks. Mobility can be defined as not just terminal mobility where a terminal or user device is connected to a network via a radio interface and moves around freely, but user mobility where a user moves from one terminal to another registering for the same incoming services to the new terminal. A growing component of seamless mobility is service mobility where a portfolio of subscribed services follows a user from one network to another. As networks and consumer demands become more complex subscribers will continue to want their subscribed services to follow them wherever they go regardless of which network they use to connect, and they will demand that the service operate in a similar and predictable manner regardless of their connection or access point. Mobility and mobility management techniques need to evolve to better meet the demands for more seamless mobility including service mobility. There needs to be a "handoff" of services and devices including horizontal and vertical mobility intersecting with hard, soft, and seamless handoffs of subscribers and their services.

In the telecommunications core network, a user is authenticated on the radio network via their device's non-dialable identification number (such as its international mobile subscriber identity (IMSI number) via a registry (such as a home locator registry (HLR) that is evolving into the home subscriber systems (HSS). At the registry, each subscriber has a subscriber service profile (SSP) that contains information regarding the services that they have subscribed to as well as where the service should "execute." Some implementations have adopted directories to facilitate maintenance of subscriber identity such as a Lightweight Directory Access Protocol (LDAP) directory or by incorporating a link to such a directory to access subscriber information. However, these techniques still require the user to "login" to incremental data services offered by the particular carrier. As a subscriber roams, the subscriber service profile (SSP) indicates or grandfathers-in service information, but if the service is not available on the particular network or by the carrier servicing the roaming device or user, the service would not work or be provided.

There is a continuing need for enhanced techniques for managing service mobility. Preferably such service mobility management techniques would allow the collaborative nature of a combined Internet and communications ecosystem to be realized by providing services and content with identity and not just subscriber's identity. More specifically, it would be useful for services and network resources to be identified, authorized (e.g., activated and deactivated), and authenticated as a carrier opens their network to third party developers and content providers to drive value added services. The techniques for managing mobility would preferably allow a user to move transparently from various networks (such as 2.5G to 3G networks, wired to wireless networks with varying bandwidth and power characteristics, and the like). Always-on connectivity is provided by such techniques by supporting an end-to-end framework and customer interfaces that provide simple, secure connectivity for the subscriber location, their device, their preferences, and, significantly, their services subscribed to working in a predictable manner. Such techniques may also predict that it is likely that roaming agreements for providing services over networks similar to the models used in the cellular communications industry will be developed and implemented.

SUMMARY OF THE INVENTION

The present invention addresses the above problems by providing a method (and corresponding software and hardware components) for managing seamless mobility in a telecommunications environment. The method generally involves combining the advantages of maintaining subscriber identity with the concept of maintaining services identities throughout a telecommunications system and even across carrier or differing network operator boundaries. Service identity is provided by the creation of service detail records that define services provided by a network operator and/or service provider and then, sharing these records with other network operators and/or service providers. Further, the method may include allocating resources of a first network to the service and then, executing the service on the first network while delivering the service to a roaming subscriber that access the core telecommunications network via a second network to which a service detail record corresponding to the service has been deployed.

More particularly, a method is provided for enhancing mobility of a subscriber in a telecommunications environment. The method includes deploying with a first network operator a service that is accessible by a subscriber via a first network. The method continues with creating a service detail record (SDR) containing information related to an identity of the service, e.g., defining the service with one or more of the following types of information: originating network, terminating network, service enabler identification, length of time the service has been invoked, quality of service requirements (QoS), time of day, service deployment and activation data, subscriber data to allow network operators to engage and fulfill a business transaction, and contextual information. The method then involves publishing the service detail record in a service registry that is accessible by a second network operator that is operating a second network. The second network operator then receives over the second network a request from the subscriber for the service and in response, processes the service detail record and based on such processing provides the service to the subscriber via the second network. To provide the services, the service may be executed on the first network using resources of the first network allocated to the service, such as by information in the service detail record.

According to another aspect of the invention, a system is provided for managing seamless mobility. The system includes a first service provider system having an application server linked to a service registry storing a service detail record that defines a service subscribed to by a subscriber. The system further includes a second service provider system that includes an application server linked to a service registry to which the service detail record has been published. The second service provider system also includes a call/session control server, a home subscriber server, and an access network. During operation of the seamless mobility management system, the second service provider system receives a request for the subscribed-to service from the subscriber over the access network and authorizes the subscriber (such as based on a subscriber profile having subscriber identity information). Once authorized, the application server, the call/session control function server, and home subscriber server act in conjunction to provide the service to the subscriber via the access network based on the service detail record.

DETAILED DESCRIPTION OF THE PREFERRED EMBODIMENTS

The present invention is directed to methods and systems for implementing and managing seamless mobility in a telecommunications environment. To this end, the invention provides a technique for providing identities for services, e.g., a service detail record or a service identity profile, that allows the service to be provided to a subscriber in a seamless fashion regardless of the network the user or subscriber uses to access the telecommunications environment or system.

The following description begins with a general description of seamless mobility as it may be provided according to embodiments of the invention with emphasis on significant enablers of the seamless mobile experience including subscriber identity and services identity. In the description, it will become clear that it is useful not just to provide an identity to subscribers that allows them to access a network and its functions but also to provide an identity to one or more services used by those subscribers. The invention also addresses the usefulness of services having mechanisms ensuring ubiquitous operation as a subscriber roams including, but not limited to, security, seamless authentication and authorization, access to content and copyright protection of that content (i.e., Digital Rights Management or DRM), and handovers as well as a billing/rating model for next generation service providers to provision and bill for that service across multiple networks and mobility dimensions. The examples or usage scenarios discussed herein highlight some of the many technical challenges at the various network layers with emphasis on network Layer 2 (L2) and network Layer 3 (L3), with one potential architecture being described for L3 to implement the service identity features of the invention.

A basic assumption in this description is that core telecommunications networks will evolve to be all IP-based versus circuit switched. As a result, this description briefly discusses IP Multi-Media Subsystems (IMS) as defined by the 3GPP standard and/or 3GPP2 standard as one useful technology for seamless mobility systems leveraged by the invention and particularly for certain types of mobility management and seamless handoffs using Session Initiation Protocol (SIP) or other such protocols. The following description generally describes communication devices, network components, computer devices, and other physical network and devices with respect to their function as it is believed that those skilled in the art will understand that numerous components may be used to implement the functional features of the invention and the invention is not limited to particular devices or physical configurations. However, the following description briefly describes a potential end-to-end framework or system that includes an augmentation to the mobility management protocol stack (e.g., IEEE 802.21 for Mobile Independent Handover (MIH)).

Yet further, to practice the invention, the computer and network devices may be any devices useful for providing the described functions, including well-known data processing and communication devices and systems such as portions of in-vehicle computer systems, personal digital assistants, personal, laptop, and notebook computers and mobile computing devices with processing, memory, and input/output components, and server devices configured to maintain and then transmit digital data over a communications network. Similarly, the wired and wireless client or cellular communication devices may be any electronic or computing device for transmitting digital data over a wired or wireless network and may be handheld and/or installed or resident within mobile vehicles such as automobiles, airplanes, ships, mobile computers and computing devices, and the like. Data typically is communicated in digital format following standard communication and transfer protocols, such as TCP/IP, HTTP, CORBA, RTP, SCTP, RADIUS, DIAMETER, HTTPS, FTP, IMAP and the like, or IP or non-IP wireless communication protocols such as TCP/IP, TL/PDC-P, WSP, Bluetooth, 802.11b, Wi-MAX, and/or other protocols or formats yet to be developed or evolved, but this is not intended as a limitation of the invention.

The landscape of today's telecommunications is a patchwork of heterogeneous networks. The "all IP" paradigm has become the implicit assumption for next generation converged network architecture design. The real added value of such networks from the subscriber's point of view will lie in offering seamless and transparent services through any kind of network. This can be achieved with a global solution for mobility management such as that described herein. The goal of seamless mobility in a network is to provide continuous and ubiquitous connectivity to the best-in-class services in a predictable, personalized, and context aware mode to subscribers regardless of the access terminal. Realization of this vision of seamless mobility presents a number of areas of opportunity for a variety of abstractions in both the L2 and L3 network topologies facilitating mobility management.

At this point, it may be useful to review some definitions or concepts relevant to the problem domain of seamless mobility and of the present invention. "Horizontal handover" may be defined as the switching between different points of attachment of the same access network, i.e., switching between different access points within a GPRS network or the like when moving between wireless base stations. "Vertical handover" represents the handover from one access network to another access network, i.e., switching from Wi-Fi to a GPRS network. Therefore, horizontal networks represents mobility within homogeneous access networks and vertical networks represents mobility within heterogeneous access networks. "Hard handover" is the complete availability of access and services between their disruption on the serving network and the target network (i.e., "break-before-make"). This is representative of what a subscriber experiences today when moving from network to network (or from one network type to another network type), i.e., they must turn on and off their access device to detect and connect to a new network (or new network type). In many instances, their subscribed to services will not be available or perhaps will not operate in a predictable fashion on the new target network. An example might be moving from WLAN to Wi-Fi a user presently may have to retrieve a new IP address via DHCP.

"Soft handover" is defined typically as "make-before-break" where handover of access and services are continuously available while the connection transfers from the serving point of attachment to the target point of attachment. The target network pre-allocates access and transport facilities to services. This may involve a subscriber moving a call from a wireless GSM device to an IP phone over cable or DSL while maintaining the call state. "Seamless handover" is defined as access and services being switched between heterogeneous networks and interfaces, where the mobile node either experiences no degradation in service quality, security and capabilities, or experiences some degradation in service parameters that is mutually acceptable to the mobile subscriber and to the new target network based on quality of service (QoS). The remainder of this description focuses on the useful enablers or components in phased progression for hard, soft, and seamless handover over horizontal and vertical mobility for seamless mobility according to the present invention. These enablers include services identity (and the concept of the service detail record (SDR)) and subscriber identity as architectural control points that remain anchor points during this functional progression. IMS in some embodiments serves as the incremental functionality to identity facilitating soft handover across horizontal/vertical networks, and in some cases, the addition of the MIH (such as from EEE 802.21) for the enhanced realization of seamless mobility.

As discussed earlier, subscriber identity is one aspect of providing seamless mobility including hard handover within vertical and horizontal networks. Identity management is a broad administrative area that deals with identifying subscribers in a system (such as a country, a network, or an enterprise) and controlling their access to resources within that system by associating user rights and restrictions with the established identity. Identity management systems may be included in systems of the present invention to help service providers or others to manage secure access to services, which means any data, voice, or video service can be accessed in a device and network independent manner in a personalize and context-aware fashion.

An identity management system used in the mobility management systems of the present invention may include four main areas of technology: access management, identity management, identity auditing, and identity repository. In a federated view of the world, a person's online identity, their personal profile, personalized online configurations, buying habits and history, shopping preferences, and the like are administered by users, yet securely shared with organizations of their choosing. A federated identity model enables every business or user to manage their own data and ensure the use of critical personal information is managed and distributed by the appropriate parties, rather than a central authority. By allowing service providers to talk to their peers, identity and policy functionality enables users to move outside their home network and still receive the same access to services.

Driving subscriber identity further into the core network provides a facility for an enhanced set of contextual building blocks useful in making future services more effective and productive for the subscriber. In the process of delivering information to a subscriber, understanding what is being asked for and why it is being requested is useful to deliver a subscriber-focused service. Context is derived from multiple services, including location, presence, and the user's current role. If the subscriber is at work, away from home, or enjoying leisure time, context can be used to help determine what type of information is being requested and what else can be provided. For example, if the subscriber is in a car during the business day and they receive notification of a change in a meeting, a map to the meeting can be delivered to the car's GPS display along with the text message. Presence identifies which devices are connected and determines how best to reach the subscriber. Presence information used in conjunction with a calendar provides the context that prevents a cell phone from ringing in a meeting, delivering a large attachment to a cell phone, or the like. Context is determined with input from these and possibly other services. It is not derived necessarily from any one capability but is typically synthesized from all of these elements, helping users get the services they want with a minimum of effort because the service is aware of their present situation.

Many standards and alliances have emerged facilitating federated identity management and these (and to be developed) may be used to implement embodiments of the invention. Standards for single-sign-on (SSO), linking disparate accounts within domains, and interaction of web services have evolved as part of the Liberty Alliance's Federation Framework: Identity Federation Frame (ID-FF) and Identity Web Services Framework (ID-WSF), Liberty Identity Services Interface Specifications (ID-SIS) for implementations of ID-WSF such as a personal identity profile service, alert service, calendar service, geo-location service, presence service, contracts service, and the like. The Liberty Alliance Project is an alliance of more than 150 global companies, non-profit, and government organizations, and this consortium develops an open standard for federated network identity that supports all current and emerging network devices, The lack of standards and reference implementations has prevented the penetration of identity concepts into the core network, i.e., service discovery, authentication, authorization, deployment, activation, deactivation, and service management.

In the core telecommunications network, there are a number of points that provide levels of authentication, authorization, service access and service delivery, with the most notable being the Home Locator Registry (HLR). In conjunction with the Visitor Location Registry (VLR), the HLR provides secure access to networks and mobility management including location and handoff management within wireless networks. Reference architectures using LDAP directory technologies along side the HLR existed prior to the present invention. One example is Lucent Technologies Super Distributed HLR (SuperDHLR). In this type of implementation, a carrier-wide Liberty Phase 1 compatible directory is linked to the carrier's HLR providing for subscription data and user profiles for multimedia services in addition to the basic HLR functionality. The Universal Mobile Telecommunications System (UMTS) describes this type of implementation as a Home Subscriber Server (HSS) and is considered an extension of the HLR. It is the purpose of the HSS to serve as a central database for subscriber profiles and mobility management enabling roaming across horizontal networks.

This is an important first step facilitating a subscriber's ability to access their subscribed to services as they roam from one network to another horizontally. However, this technique taken alone focuses on the identity domain from the subscriber perspective and not from the service perspective, and as a result, it does not address the service registration and deployment for service access control for third party developers and enterprises. However, this type of implementation represents the first iteration of providing seamless mobile access to services for subscribers where a subscriber can experience hard handover over horizontal networks. Future network providers and users will demand that service mobility be managed at least as well as terminal and user mobility is managed today, i.e., a service will be transparently available when a subscriber moves from one network to another, but there are challenges that need to be overcome and that are in part addressed by the services identity features of the present invention (e.g., improve a user's experience for hard handover in horizontal homogeneous networks as well as drive the functional progression for seamless mobility discussed below with reference to soft handovers in vertical and horizontal networks and to seamless handovers in vertical and horizontal networks).

Another aspect of providing or managing seamless mobility is how best to handle soft handover within vertical and horizontal networks. To achieve this aspect of seamless mobility, it is useful to have a functioning and efficient IP multimedia system or IMS. IMS is a foundation control layer infrastructure useful for realizing the "All-IP" core network in the context of enabling composite services and seamless mobility. In some embodiments, IMS is a product of primarily two standard bodies, 3GPP and 3GPP2 who are participants in the IMT-2000 (International Mobile Telecommunications-2000). The IMT-2000 represents an ITU standard defining the global standard for 3G networks aimed at providing telecommunication services using radio links, and this or similar standards may be utilized within service mobility management systems and methods of the invention.

IMS is included in embodiments of the inventive system to provide incremental functionality and control for IP in three main areas: QoS, charging, and development of composite value add services. The IMS takes care of synchronizing session activation with QoS so that users have a predictable experience. IMS provides mechanisms for operators to charge for multimedia sessions appropriately. Typically, operators charge for data by the number of bytes transferred, and for a videoconference, this could be a substantial charge to the subscriber due to the fact that the operator does not have visibility into the contents of the bytes. IMS makes it possible for an operator to be aware of the actual service that the subscriber is using and can then provide an alternate charging schema. IMS provides information about the service being invoked by the subscriber, and with this information, the operator decides whether to use a flat rate for the service, to apply traditional time-based charging, to apply QoS based charging, or to perform a new type of charging. Implementing an IMS allows operators to develop composite value added services. This is helpful in the development of strategic partnerships and collaborative eco-systems leading to new revenue streams for the operators. Operators want to able to use services developed by third parties, combine them, integrate them with services they already have, and provide subscribers with new innovative services. IMS can be used to define the standard interfaces to be used by service developers.

Based largely on Internet protocols, IMS, in part, provides subscribers in a mobility management system the ability to execute all their services when roaming as well as from their home networks. IMS also creates a service environment where any service can access any aspect of the session. When a service can access particulars of a session, it can perform many operations without sending data over the air to the access terminal thus saving radio capacity affecting over all QoS. For example, a service could insert an announcement in a conference call based on an event that happens on the Internet, such as the change of the presence state of a colleague from busy to available.

Figure 1:
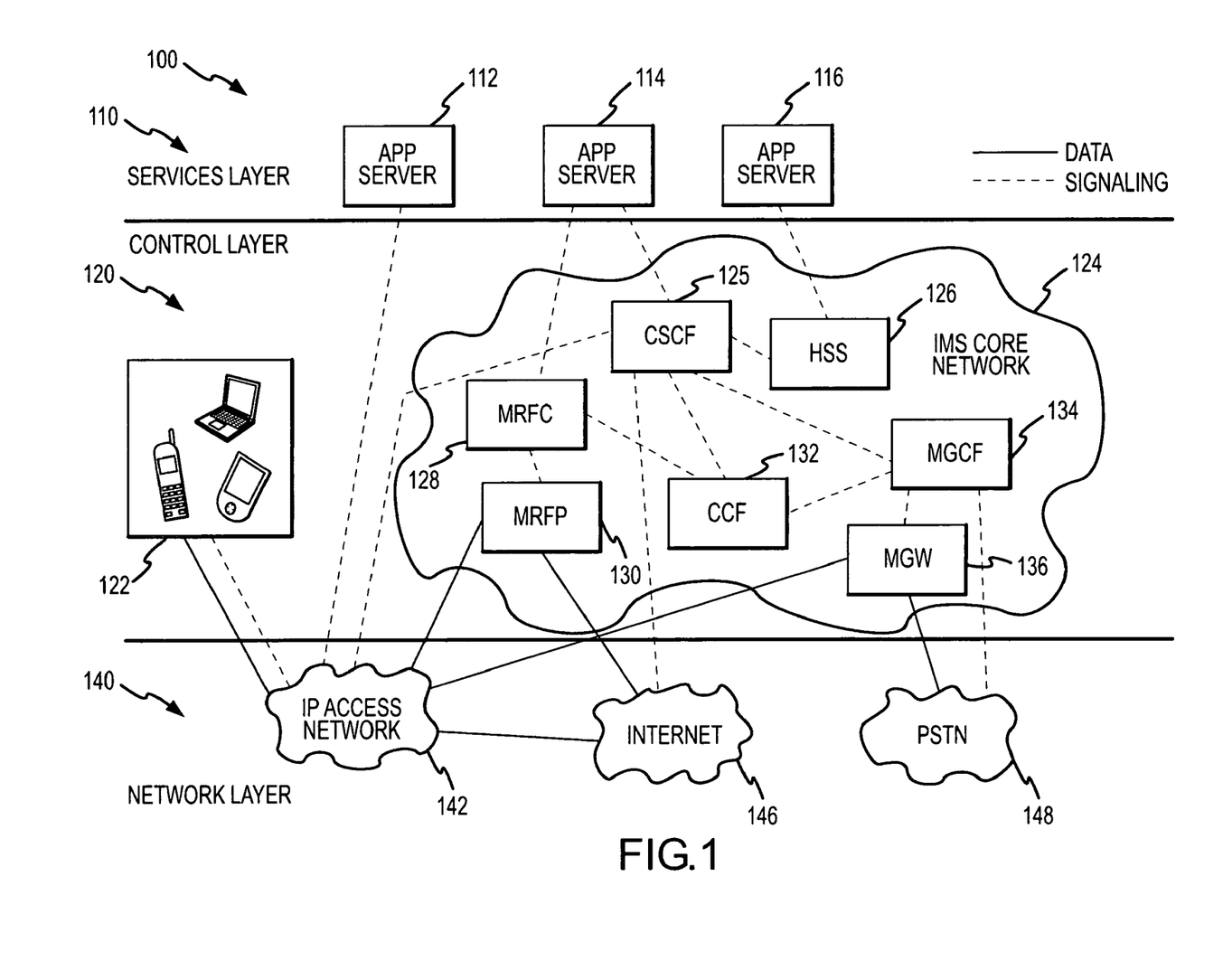
FIG. 1 illustrates in block diagram form a service mobility management system in which the service identity aspects of the invention may be provided in an IMS-based architecture with the system being a high level depiction of system definitions of the 3GPP and 3GPP2 worldwide multimedia standards.

FIG. 1 illustrates a service mobility management system 100 of the present invention. The system 100 is shown divided into layers including: a services layer 110 having a number of application servers 112, 114, 116; a control layer 120 made up of a subscribers communication or access devices 122 (sometimes referred to as client, user, or network devices, too) and nodes in a telecommunications core network (or IMS core network) 124; and a network layer 140 including an IP access network 142, a digital communications network (e.g., the Internet) 146, and a PSTN (Public Switched Telephone Network) 148. The system 100 is shown as a functional representation of an IMS-based architecture and is shown to illustrate a number of nodes that are defined by the IMS specification. The nodes that are more relevant to this description of seamless, service mobility include: a call/session control function (CSCF) server 125; a Home Subscriber Server (HSS) 126; and the application servers 112, 114, 116. Other nodes are also typically included in the core network 124 such as, but not limited to, a MRFC (media resource function controller) 128, a MRFP (media resource function processor) 130, a CCF (call control function) 132, a MGCF (media gateway control function) 134, and a MGW (media gateway) 136 whose functions will be understood by those skilled in the arts.

The HSS 126 is the central repository for user-related subscription data used to handle multimedia sessions including: location, security (e.g., authentication and authorization), user profile information (e.g., services that the user subscribes to), and information as to which CSCF 125 is allocated to a specific subscriber. Although the network 124 can have more than one HSS 126, another component not shown may then also be required, i.e., a database that maps subscriber addresses to a HSS. For simplicity, it will be assumed in the following description that only one HSS 126 is used in the following examples, and in most embodiments, it will also be assumed that the HSS 126 implements the Diameter protocol but, of course, other protocols may be implemented by the HSS 126 to practice the invention.

The CSCF 125 may be implemented as a Session Initiation Protocol (SIP) server, and may be considered an important node in the network 124 as it processes signaling in the network 124. There are three types of CSCF that may be used to implement the CSCF 125 including a Proxy-CSCF (P-CSCF), an Interrogating-CSCF (I-CSCF), and a Serving-CSCF (S-CSCF), which all typically implement the Diameter protocol. The P-CSCF is the first node in the signaling plane of the network 124 as the IMS terminal connects to the IMS core network 124. The P-CSCF asserts the identity of a subscriber to the rest of the nodes in a network and is the trusted node by all other nodes in the network 124. Further, the P-CSCF establishes a number of IPsec associations for an IMS terminal, generates charging information for a charging node, and can include Policy Decision Functions (PDFs). The PDFs authorize media plane resources and manages QoS. The I-CSCF portion of CSCF 125 is a SIP proxy located at the edge of an administrative domain and is the interface to the HSS 126 (and mapping database if more than one HSS is utilized). The S-CSCF portion of the CSCF 125 is a also a SIP server and is a central node of the signaling plane providing session control. It is also a SIP registrar that maintains the binding between the user location and the user's SIP address of record (in IMS terms: the "Public User Identity"). For simplicity of discussion, these three portions are referred to simply as the CSCF 125 of network 124.

As multimedia services become more widely used, it will be desirable to move beyond the basic QoS mechanisms used today. In addition to monitoring the available bandwidth, it will be preferable to control the number of active real time communications sessions. With an IMS architecture such as that shown in system 100, endpoints and applications servers 112, 114, 116 for VoIP and broadband multimedia services send their session initiation requests through a common CSCF element 125. The CSCF 125 can interact with the transport and endpoint layer 140 of the system 100 to assess current traffic levels and can deny requests for additional sessions to provide a dimension of QoS.

Another node of particular relevance to seamless mobility is the AS or application server 112, 114, 116. The AS 112, 114, 116 is typically provided as an SIP entity that hosts and executes services interfacing with the CSCF 125 via SIP. The AS 112, 114, 116 can have different modes depending on the situation where it could be a SIP proxy, a SIP User Agent or endpoint, a SIP Back-to-Back User Agent, or the like. For example, the IMS specification describes three types of AS: an SIP AS (SIP-Application Server); an OSA-SCS (Open Service Access-Service Capability Server) for OSA frameworks; and an IM-SSF (IP Multimedia Service Switching Function) for CAMEL, and the AS 112, 114, 116 of system 100 (and of other illustrated systems) may take on one or more of these types or function modes.

Figure 2:
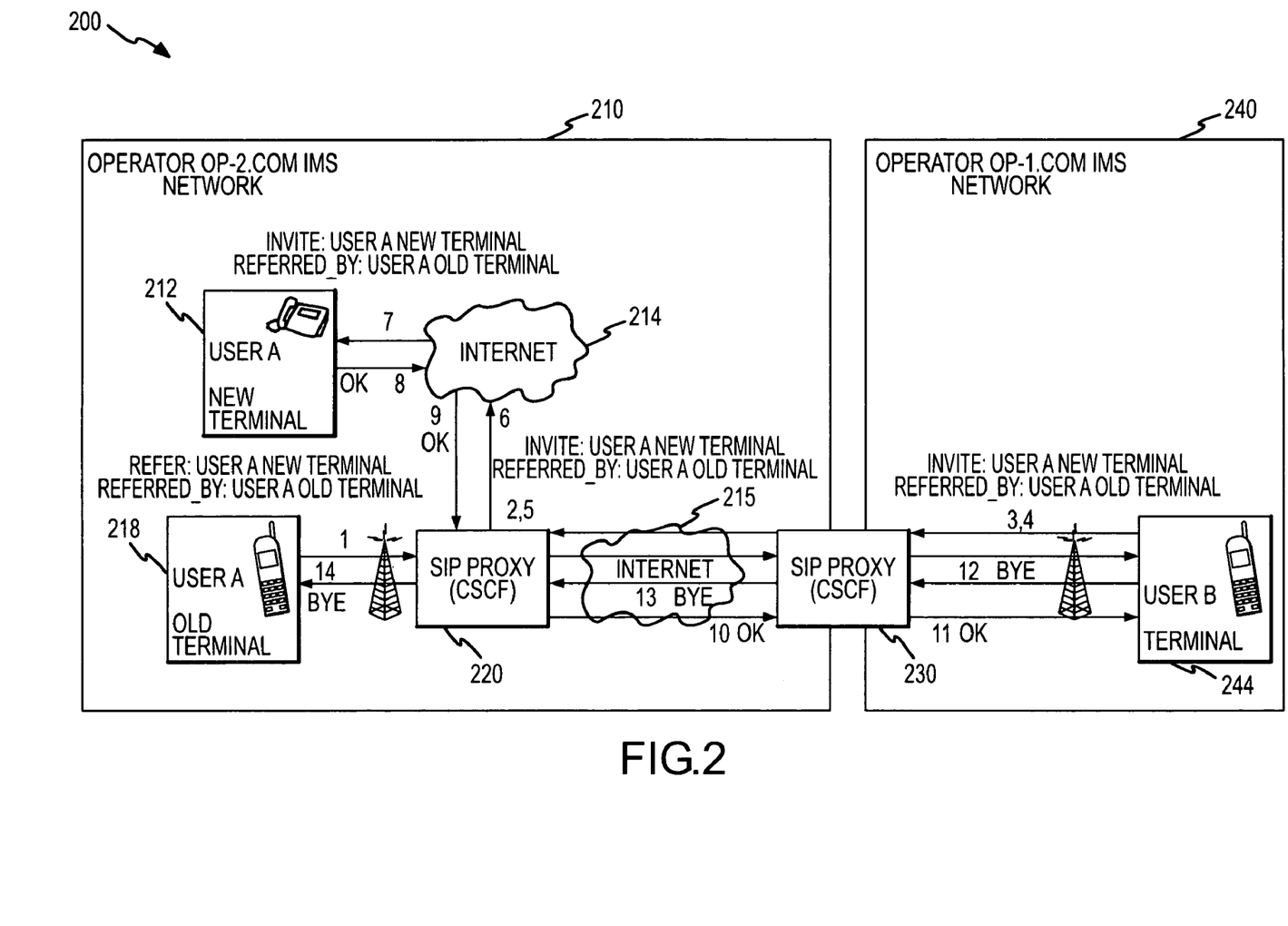
FIG. 2 illustrates a service mobility management system in which a user transfers a call in a seamless manner.

Key protocols in an IMS core network 124 may include SIP, RTP (Realtime Transport Protocol), and Diameter. FIG. 2 illustrates how communications within a service mobility management system, such as system 100, may occur. Specifically, FIG. 2 illustrates a mobility system or network 200 showing how the SIP re-negotiation (SIP REFER) feature allows a user to remain in contact with their access network even if they change terminals during a session, ie., soft handover. Other advanced implementations using SIP are as a network server that assists in session initiation that could interpret the session descriptions and then, act as a bandwidth broker to install the QoS information into the network 200, further proving SIP's importance in seamless mobility. SIP is about enabling the characteristics of a session to be tailored to the terminal and network through which a user is connected. Diameter is discussed further below with reference to FIG. 3 and with respect to its relevance to the new feature of services identity and the SDR.

As shown in FIG. 2, the system 200 includes two IMS networks 210 and 240. One IMS network 210 includes an CSCF node 220 (or SIP proxy) and two communications networks (e.g., the Internet or Internet access networks) 214, 215. A user may utilize an old or original terminal 218 or accesses the network 210 via a new terminal 212. A second IMS network 240 is shown to include another CSCF node (or SIP proxy) 230 that communicates with the IMS network 210 via digital communications network 215 and SIP proxy 220. A second user is able to access the network 240 and network 210 via CSCF 230. In the system 200, the arrows numbered 1-14 are used to indicate along with the text provided in the figure that a user (i.e., User A) at a first network (i.e., network 210) transfers a call (such as a VoIP call) to a different IMS terminal 212 while continuing to talk to a second user operating a terminal 244 on a second network (i.e., network 240—with the two networks being operated by two different operators). The seamless mobility management processes described below with reference to FIG. 7 typically will occur prior to a user wanting to invoke the service as shown in FIG. 2.

Typically, the provisioning and establishment of a subscribed to service in two or more networks of the same or differing types takes place, as discussed with reference to FIG. 7, at a mutually agreed "polling" interval between carriers where registries are synchronized. For example, prior to User A on their old terminal initiating the "switch" to the new terminal, the service that they want to access on the new terminal has already been registered between carriers. The appropriate SDR has already been transmitted and processed, such as via XML and Diameter sessions, within the operators' networks so that this service is deployed (i.e., made ready to be used by User A). Then, when User A initiates the "switch" to the "new terminal" the operator (of the network in which the new terminal is connecting) activates the service and its enablers to complete the transaction.

In a telecommunications core network (such as network 124 of FIG. 1), a user is authenticated on the radio network via their devices International Mobile Subscriber Identity (IMSI) number via a Home Locator Registry (HLR) which is evolving to the Home Subscriber System (HSS). At the HSS, each subscriber has an SSP (subscriber service profile, not shown in FIGS. 1 and 2) which contains information regarding the services that they have subscribed to as well as where the service should "execute." As a subscriber roams, the SSP would grandfather service information. However, if the service is not deployed on the particular network they are roaming on, the service would just not work. There is no mechanism in prior systems for a service to communicate its requirements to the new target network like, for example but not limited to, QoS parameters execution requirements and to exchange information for inter-carrier billing.

To more fully realize the collaborative nature of a combined Internet and communications ecosystem, services and content are provided an identity according to the present invention. Services and network resources are able to be discovered, deployed, authorized (e.g., activated and de-activated), and authenticated, which is even more significant as carriers open their networks to third party developers of services and content providers to drive value added services and such service-related mobility management is important for providing seamless mobility. A services identity framework is the mechanism by which context aware services are deployed and available across multiple networks providing the foundation for a seamless mobile experience across federated services. Service deployment is defined as all the functions that are carried out by an operator to make a service "ready" for a subscriber to activate and is one of the problems that the service identity features of the invention address.

Services identity frameworks of the invention facilitate the integration of services identity and policy information (including DRM) from many sources within the core network. In turn, this data is made available to and can be put to use by all or most of the service components. Mobility is facilitated by a service component's ability to be aware of who is making the service request (e.g., subscriber identity), what the context is, the network that is available, and how to fulfill the business relationships as part of billing as the settlement of revenue with content providers (linked with DRM), e.g., bill for the service. Because the requests can come from any user device and from anywhere, the ability to share information about who a subscriber is and what access rights they have is important to fulfill the service request at an acceptable QoS.

In this regard, a service identity framework according to one embodiment of the invention is used to define a framework (such as an XML-based framework) for communicating contextual security, identity (e.g., authentication, entitlements, and attributes), policy, and contextual service information between network entities. It also promotes interoperability between disparate networks, providing the facility for secure mobility of services across carrier boundaries. By abstracting away from the particulars of different services infrastructures (e.g., HLR, HSS, SSP, CSCF), this framework makes possible the dynamic integration necessary in today's constantly changing telecommunications environments.

Figure 3:
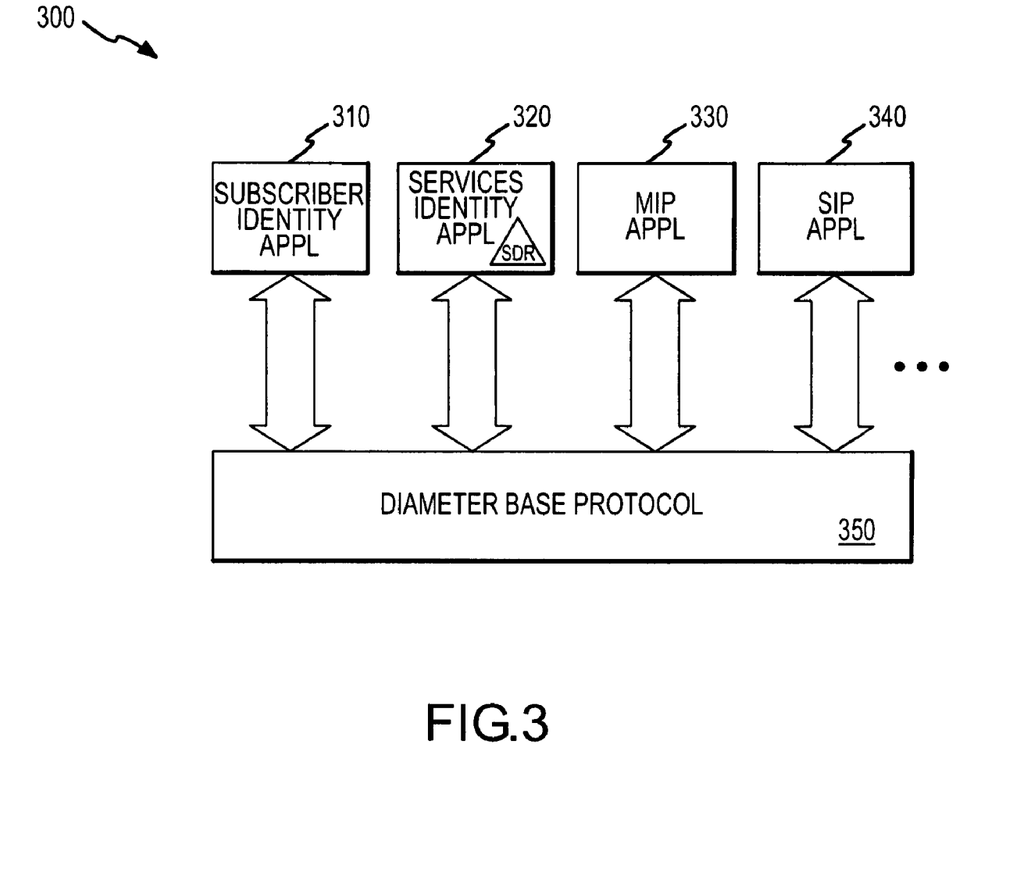
FIG. 3 illustrates services identity framework according to one embodiment of the invention using Diameter as a base protocol for mobility management applications.

In one embodiment, such a service identity framework is implemented within the Diameter protocol framework and includes the IMS components such as HSS and CSCF. The Diameter Protocol was selected for the embodiment of the invention to perform AAA functions within the core network instead of the RADIUS protocol (which may be used in some cases) as it does not run over UDP but rather a more reliable transport (e.g., TCP, SCTP, or the like) offering congestion control. Diameter defines the functional entities for the purpose of performing AAA. FIG. 3 illustrates a service identity framework 300 implemented using the Diameter protocol and including a base protocol 350 upon which a number of applications are built and able to communicate (with the applications 310-340 being applications that complement the base protocol 350 functionality). These applications or modules include a subscriber identity application 310, a services identity application 320, an MIP (Mobile Internet Protocol) application, and an SIP application 340, with other applications not being shown with an understanding that additional applications may be included in the framework 300.

Figure 5:
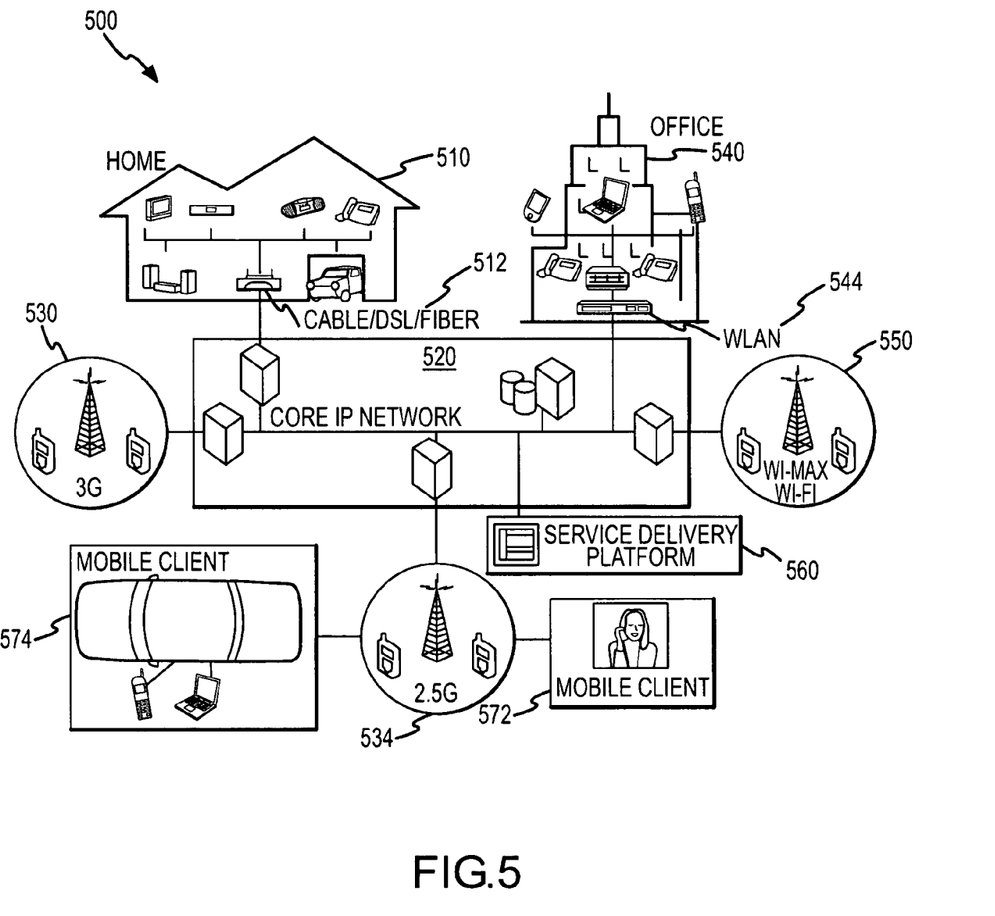
FIG. 5 illustrates a mobile system in which service mobility management features of the invention may be implemented.

The base protocol 350 includes all basic functionality and is implemented within all Diameter nodes. Applications 310-340 can be extensions to the base functionality and are tailored for a particular usage of Diameter determined by a specific usage scenario. In the case of IMS, the Diameter session might include the message exchanges between a CSCF (e.g., a Diameter client) and an HSS (e.g., a Diameter server) for the lifecycle of registration of a subscriber or a service to the IMS core network. The Diameter client is a functional entity that performs access control and the Diameter server is the functional entity that performs authentication and authorization. Therefore, the HSS and CSCF are viable considerations as the touch points for services identity and subscriber identity implementations. FIG. 3 illustrates how the a Diameter-based framework offers an instantiation for the services identity framework 300 that can be used within an IMS core network (such as that shown in FIGS. 1 and 2) to drive forward to the seamless mobility vision (as shown in FIG. 5).

The services identity framework 300 standardizes all aspects of services identity management. Significantly, it addresses key aspects of services management, namely, how service profiles can be communicated from one network to another. The framework 300 (and as further discussed with reference to FIG. 4 and later figures) defines mechanism for: provisioning and authorization (e.g., the establishment and subsequent management of services and associated privileges), authentication (e.g., how a service proves its right to lay claim to a particular network resource), access control (e.g., how the rules for specifying what service entities are allowed to do are captured for billing purposes), and billing functions. The services identity framework 300 is preferably designed and implemented in practice to be compatible and extensible with existing and emerging standards that address these and other aspects of mobility management and handoff, such as IEEE 802.21 (with this standard discussed further below).

Subscriber identity coupled with services identity acts as an enabler of mobile digital rights management (or DRM). DRM provides the infrastructure for the usage and transaction control of content delivered over the air. In mobile environments, DRM can be used for over the air delivery of content formats such as ringing tones, screen savers, games, Java applets or other programming modules, images, and the like. DRM technology creates a sustainable environment for the retailing of mobile content with a transaction-based business model. The underlying functionality of federated identity and policy enable service providers and users to strike a balance between access rights and user privacy. Licensing and DRM models are likely to become increasingly relevant for managing revenue and ensuring non-repudiation capabilities.

With the description of hard and soft handovers and their relationships to managing seamless mobility understood, the description proceeds to service mobility as it relates to improved seamless handovers within vertical and horizontal networks. An important component of providing service mobility within a telecommunications core network is to provide effective mobile independent handoff (MIH) (e.g., MIH such as or similar to that specified in IEEE 802.21). MIH defines an architecture that facilitates multiple dimensions of physical handover each being relevant to a different dimension of seamless mobility, i.e., horizontal and vertical as well as hard, soft, and seamless handover for preservation of services. Although MIH facilitates seamless handover between networks, higher layer mobility protocols such as SIP or Mobile IP (MIP) could be supported for handover and seamless session and service continuity. As discussed above, there are other mobility mechanisms based on upper Layer 3 protocols such as SIP that could be used as part of a phased implementation strategy for a small subset of services. However, SIP is unaware of the operational state of the underlying link that supports the communication channel, and this would affect the delivery of services that require low delay and latency as packets are dropped or delayed when the terminal is connecting to a new network point of attachment. It is the opinion of the inventor that MIH can augment L3MP, e.g., SIP, by providing link-level and other information that could be used by the L3MP to characterize the conditions of both the existing communications link and potential target networks thus more accurately characterizing seamless mobility systems and methods of the present invention.

The primary role of the MIH function in systems of the invention is to provide: abstracted services to higher layers (Layer 3 and above), to facilitate handoffs, and to provide intelligence to the network selector entity or the mobile management entity responsible for handover decisions. The MIH function provides services to the upper layers through a single technology-independent interface and obtains services from the lower layers through a variety of technology-dependent interfaces. Taxonomies addressed by MIH include: service continuity, application classes, QoS, network discovery, network selection, security, power management, handovers due to mobile terminal movement, and handover policy. MIH functions include: Media Independent Handover Functions (MIHF), Media Independent Information Service (MIIS), Media Independent Event Service (MIES), and Media Independent Command Service (MICS). The MIHF provides asynchronous and synchronous services through well-defined interfaces. The services provided by the MIHF help the L3MP, like SIP maintain service continuity, facilitate service adaptation to varying QoS, battery life management, network discovery and link selection.

In a system containing heterogeneous network interfaces of 802 and cellular types for example, the MIHF can help the L3MP to implement effective procedures to build composite services, which could include but are not limited to subscriber and service identity services. MIIS provides the mechanisms for the MIH to discover and obtain network information existing within a geographical area to facilitate handovers. It could include a set of information elements, their structure, representation and query/response mechanism for information transfer. The MIIS represents an opportunity to be driven by the requirements of a services identity framework. MIIF would provide, for example, the framework by which a handoff function (mobile node and network) can discover and obtain homogenous or heterogeneous network information for seamless mobility. The MIIF entity would aggregate information from a number of services and media types to facilitate inter-media handover decisions. MIES is the enabler used to promote handover detection within the L3MP, i.e., SIP and includes the facility to carry additional context. MICS refers to the decision commands carried from the upper layer to the lower layers on a local or remote entity and would, therefore, control the behavior of lower layers. The MICS represents another key touch point with services and subscriber entity context communications.

Figure 4:
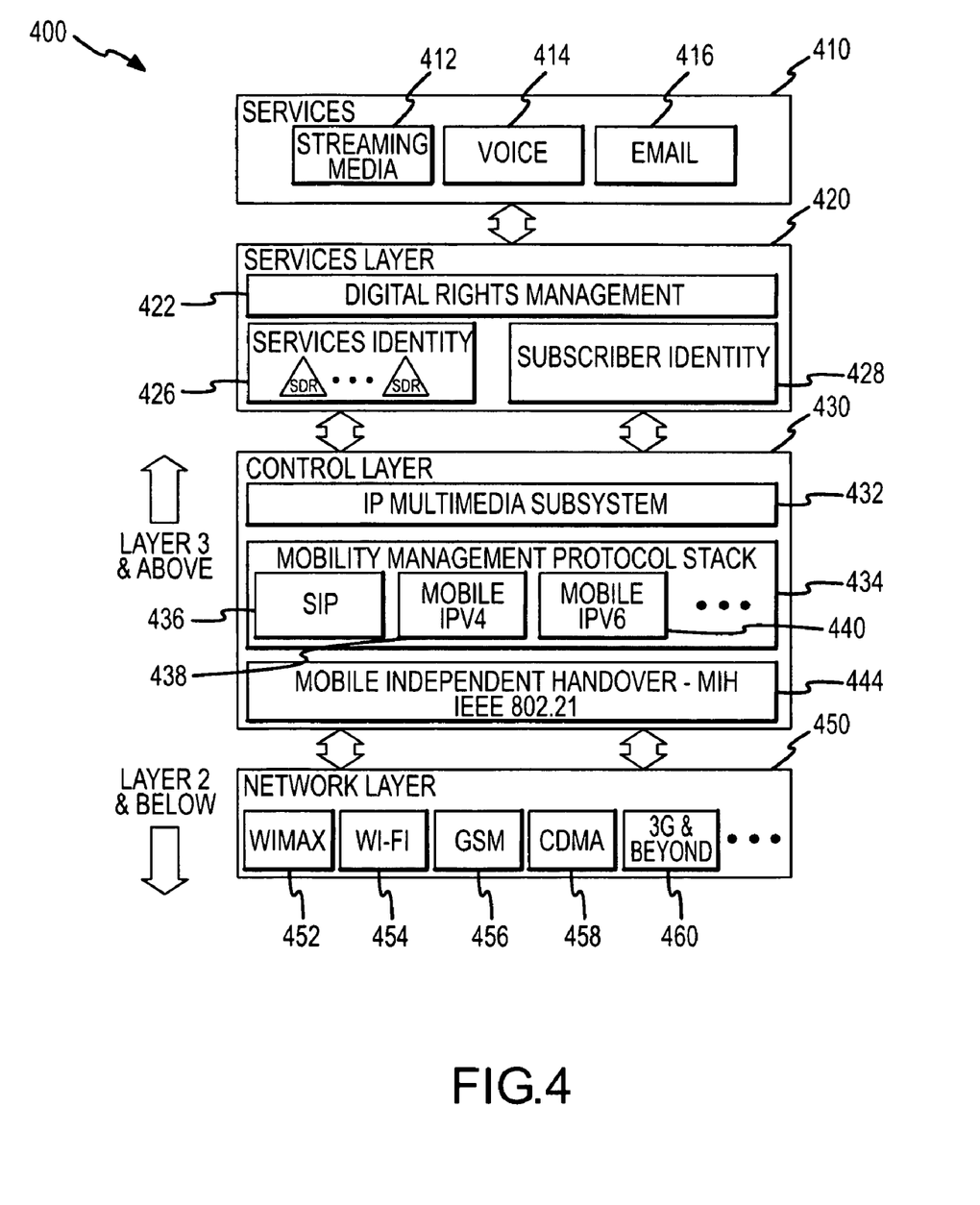
FIG. 4 is a services mobility management system of the present invention that presents a logical representation of an architectural pattern that is useful for the realization of seamless mobility of users in which their services are available regardless of their network access point.

FIG. 4 illustrates a services mobility management system 400 of the present invention that presents a logical representation of an architectural pattern that is useful for the realization of seamless mobility of users in which their services are available regardless of their network access point. As shown, the system 400 includes a set of services 410 including, for example, streaming media 412, voice 414, and email 416 provided on top of a services layer 420 which provides digital rights management 422 and significant to this invention both services identity 426 and subscriber identity 428. The services layer is provided on top of lower layers including the control layer 430 and network layer 450. The control layer 430 is made up of an IP multimedia subsystem 432, a mobility management protocol stack 434 (including, for example, SIP 436, Mobile IPV4 438, Mobile IPV6 440, and the like), and mobile independent handover (MIH) 444. The network layer 450 may take a number of forms to support communications with multiple user devices over varying communications networks and may include modules or portions supporting WiMAX 452, Wi-Fi 454, GSM 456, CDMA 458, 3G & beyond 460.

A goal of the invention is to better support a seamless mobile lifestyle. FIG. 5 illustrates a mobile system 500 in which the service mobility management features of the invention may be implemented. As shown, the system 500 includes a user's home 510 with a cable/DSL/fiber connection 512 to a core IP network 520 along with other access points for the user including an office 540 with a WLAN connection 544 and mobile connections or clients 572, 574. The mobile clients 572, 574 (or home and office 510, 540) may access the core IP network 520 via a number of networks such as a 2.5G network 534, a 3G network 530, and/or a Wi-MAX or Wi-Fi network 550. Services are provided in a seamless fashion by a service delivery platform 560 in part using the aspects of services identity and subscriber identity discussed further below.

The system 500 provides a ubiquitous continuity of the user experience across networks 530, 534, 550, domains 510, 540, 572, 574, and regardless of access or client device. In the system 500 literally billions of things or devices can be connected to the Internet and communications networks, with these networks being self-managing and self-forming while providing the continuity of the user experience. This is achieved in system 500 by implementing an end-to-end framework (as shown in FIGS. 1-4) with the appropriate subscriber and third party interfaces that provide simple, secure connectivity for the subscriber location, their device, their preferences, and the subscribed to services.

Figure 6:
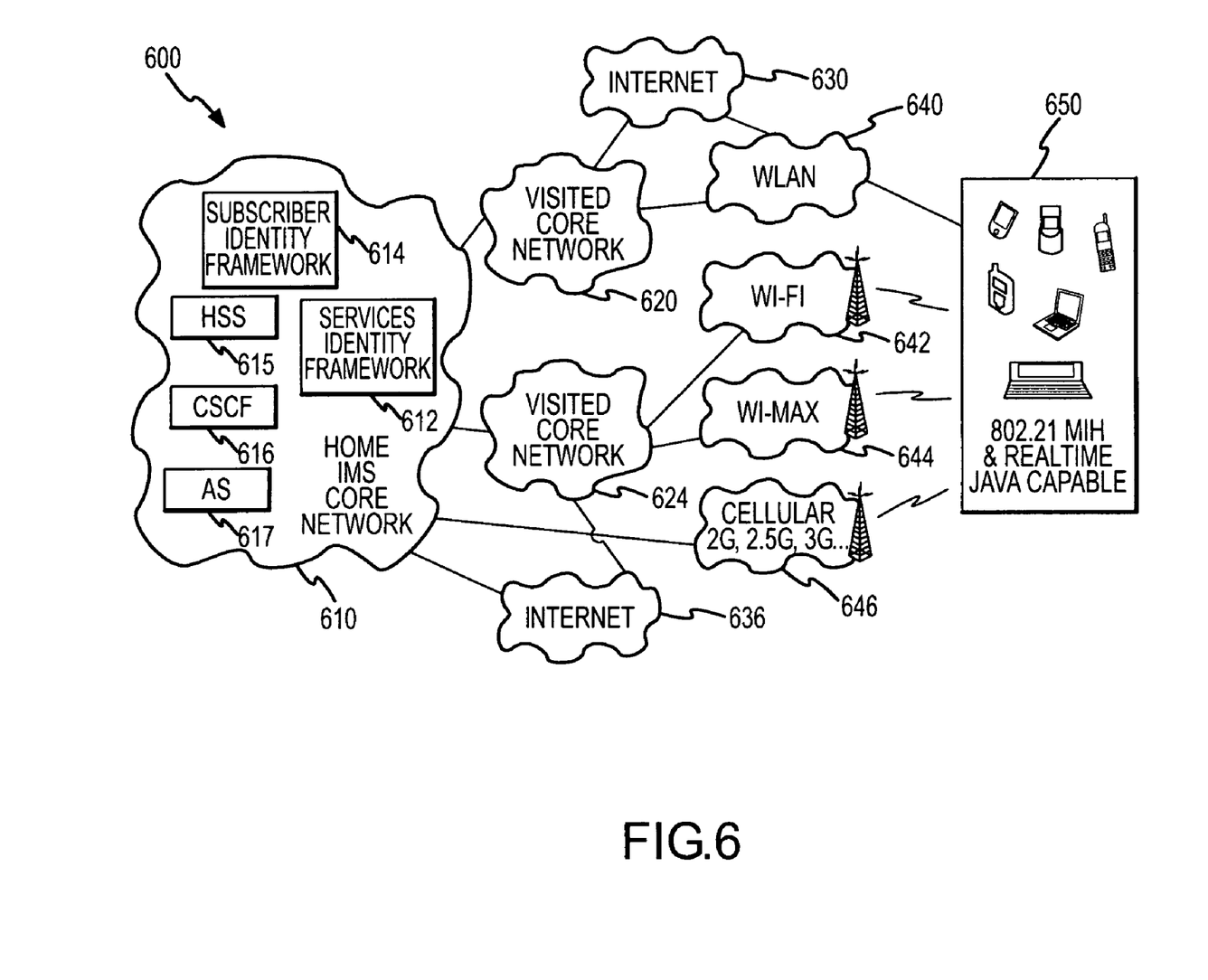
FIG. 6 shows a services mobility management system or network illustrating operational aspects and useful "locations" of various components of the invention.

FIG. 6 illustrates a communication system 600 providing seamless mobility for users and for their subscribed to services. The system 600 is shown to include a home IMS core network 610 in which is provided a services identity framework 612, a subscriber identity framework 614 as well as one or more HSS, CSCF, and AS servers 615, 616, 617. Mobility for a client 650 is provided as the client (or their devices) 650 can connect to the home core network 610 and visited core networks 620, 624 and digital communication networks (such as the Internet) 630, 636 via any of a number of networks 640, 642, 644, 646 (e.g., WLAN, Wi-Fi, Wi-MAX, and cellular). The system 600 is intended to illustrate a concept of operations that highlights the key architectural control points in the technology roadmap to seamless mobility (e.g., realization of "always-on" connectivity, anywhere, at any time over any available network). Significant control points in system 600 include an "All-IP" network facilitated by IMS aspects of networks 610, 620, 624 (such as HSS 615, CSCF 616, and AS 617), subscriber identity 614 to provide the ability to deliver context sensitive personalized content to the end user, and significantly, services identity framework 612 to ensure that subscribed to services are deployed, available, and billed for across mobility dimensions. It is typically also useful as discussed above to provide an abstraction (not shown) at Layer 2 (e.g., at the client 660) facilitating mobile handoff (such as with MIH according to IEEE 802.21 or the like).

As will be understood from the prior description, unique features of the invention are the concept of providing a services identity to support seamless mobility and techniques for implementing this services identity concept. In preferred embodiments, the service detail record or SDR is provided for each service that is to be provided in a mobile fashion in a core network regardless of the subnetwork used to access such a core network or the terminal or client device used by a subscriber. According to the invention, the service detail record or SDR is a services identity abstraction within the core telecommunications network services framework that allows a service to describe itself to a new network and to authenticate with a network service or element, whereby the network automatically authorizes access to core network functionality. The SDR addresses the difficulty to describe services that are include a series of complex network elements and protocols in a common way so that these services can be federated across networks and network operators such that, for example, a service that a user subscribes to in their home network is available to them with the same predictable features while they visit another network, e.g., an 802.11 wireless network or the like in their home or office or while mobile.

The SDR in some preferred embodiments integrates identity and policy information from one to many sources within the network services environment, and such integration of information allows federation of identity and policy information associated with individual network services. In turn, this SDR data can be put to use by any of the network service components. Mobility is facilitated by use of SDRs when combined with subscriber identity by a service component's ability to be aware of who is making the service request. Because the requests can come from any device and anywhere, the ability to share information about who a user is and what access rights they have across a network is very desirable. The use of SDRs also provides a facility for an enhanced set of contextual building blocks useful to help make future services more effective and productive for the user. In the process of delivering information to a user, understanding what is being asked for and why it is being requested is useful in delivering a subscriber-focused service. To this end, the typical SDR includes taxonomy to describe protocols, service enabler identifiers/description, network access, provisioning parameters, copyright and DRM attributes, and billing contexts used to federate a service across heterogeneous networks. Such federation includes, but is not limited to: service discovery, network authorization, network authentication, service activation/deactivation, and service management (e.g., billing functions). Note, SDRs are preferably configured to have an extensible nature, and additionally, in some embodiments, the operator or "user" can define parameters that are specific to a particular service and its enablers and such parameters would be provided in the SDR associated with that operator's or user's service.

Figure 7:
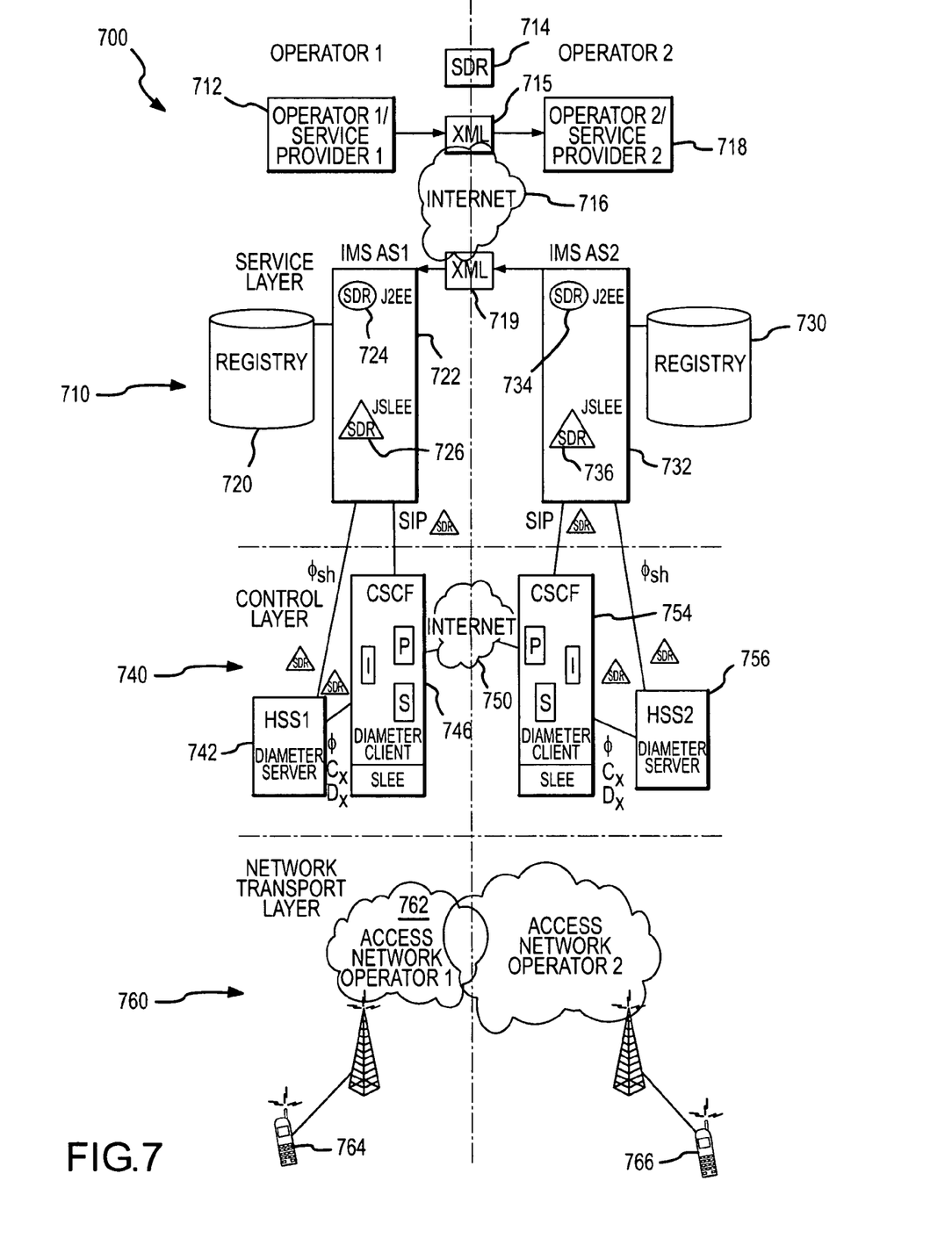
FIG. 7 illustrates a telecommunications network configured according to an embodiment of the invention to provide seamless mobility through the use of service detail records to share services among network operators.

FIG. 7 illustrates a services mobility management system 700 in which SDRs are utilized to allow a subscriber or user to be mobile while accessing their subscribed to services in a seamless manner. However, before describing the creation, storage, and use of SDRs with reference to FIG. 7, it may be useful to describe SDRs in yet further detail as envisioned by the inventor. A SDR is a computer record containing data and/or parameters that are unique to a specific service. This service information is processed and provisioned as a unit (or SDR) and contains such details including, but not limited to, originating network, terminating network, service enabler identification, length of time service has been invoked, quality of service requirements (QoS), time of day, and the like. The SDR also typically defines service deployment and activation specifics such as start time, elapsed time, date, and other pertinent subscriber data to allow operators (such as network operators) and service providers to engage and fulfill a business transaction as specified by the contractual relationships between different operators, service providers, and third party service developers. The SDR preferably also preserves contextual information to provide an enhanced subscriber experience with relation to their subscribed to services.

The use of SDRs, such as within system 700, standardizes all aspects of service identity management. The SDR addresses key aspects of services management such as how service information can be communicated from one network domain to another (e.g., by sharing or transmitting SDRs for relevant services among network domains). The SDR defines or provides mechanism for: provisioning and authorization (e.g., the establishment and subsequent management of services and associated privileges), authentication (e.g., how a service proves its right to lay claim to a particular network resource), access control (e.g., how the rules for specifying what service identities are allowed to do are captured for billing purposes), and billing functions. Preferably, each SDR is configured to be compatible with existing and emerging standards that address other aspects of mobility management.

Referring now to FIG. 7, the system is shown (similar to FIGS. 1 and 4) to include a services layer 710, a control layer 740, and a network transport layer 760. Briefly, in the services layer 710, a first operator/service provider 712 is provided that communicates with a second operator/service provider 718 via the Internet or other digital communications network 716 (such with AS 722, 732) such as via XML documents or other documents/messages 715, 719, which may include one or more SDRs 714. The services layer 710 is also shown to include for each operator 712, 718 a directory/registry 720, 730 (which may be LDAP directories or the like) for storing and/or providing access to subscriber identity information (such as subscriber profiles) and service identity information (SDRs). Application servers (such as IMS application servers) 722, 732 are also associated with each operator 712, 718. Each of these AS 722, 732 is shown to act to serve SDRs 724, 726, 734, 736 and are shown as having two separate portions or modules. Particularly, in some embodiments, the IMS application servers 722, 732 will include a J2EE portion or framework and a JSLEE portion (i.e., a JAIN Service Logic Execution Environment). JSLEE is a Java based service platform similar to the now-familiar J2EE platform but provided more for executing event-based applications requiring high availability and real-time performance more characteristic of the low-latency, high-throughput telecommunications requirements. JSLEE platforms in servers 722, 732 provide a standardized programming model for network resources presenting a real-time event model to the J2EE component programming model or portion of servers 722, 732. JSLEE also defines a standard management interface, JAVA management extensions (JMX), and a resource adaptor framework for managing and monitoring service oriented networks including generic profile interfaces, persistence management for state redundancy, and concurrency control, with other real time functions being available such as timers, alarms, usage tracking, traces, and the like useful for providing services in network 700. Of course, the servers 722, 732 may take other forms to practice the invention and may include only one platform or more than two platforms to serve services using the SDRs 724, 726, 734, 736.

The control layer 740 communicates with the service layer 710 and the network transport layer 760 including transmitting SDR or SDR data. In the illustrated embodiment, each operator network is linked in the control layer 740 by Internet 750 and SIP communications are presented to the other operator network to Diameter clients (i.e., CSCF or SIP proxies) 746, 754, which in turn are each also shown to include a layer of JAIN or more specifically, a Service Logic Execution Environment (SLEE). The CSCF 746, 754 passes SDR or SDR data via SIP communications with the IMS application servers 722, 732 within each operators portion of the system 700. The control layer 740 further includes Diameter servers 742, 756 as the HSS component and communicate via Diameter protocols SDR or SDR data to the IMS AS 722, 732 and CSCF 746, 756 within the operator/service provider's portion of service mobility management system 700. In brief, SDRs get posted and processed by the Diameter client (CSCF) and the Diameter server (HSS) to deploy, authorize and provision, and authenticate the service as well as to provide activation parameters.

The network transport layer 760 of system 700 is shown to include an access network(s) 762 used by one or more client devices 764, 766 to access the services provided by operator/service providers 712, 718 regardless of their access point to network 762 or the terminal/device 764, 766 they use. The devices or clients 764 may represent two devices operated by a single subscriber in a similar or disparate geographic location and/or may be used to represent two subscribers accessing the same service or different service within system 700.

During operation of the system 700, there are interactions relating to SDRs 714, 724, 726, 734, 736 in the service layer 710 as well as network transport layer 760 interactions of SDR from CSCF 746, 754. Service layer interactions are (in the illustrated embodiment) via an XML framework as shown by transfer of XML documents 715 and 719 over Internet 716 that are related to SDR 714. In contrast, the interactions within the network transport layer 760 and the control layer 740 are typically via the Diameter Base Protocol Framework such as between the HSS, 756 (Diameter server) 742, and the P-CSCF 746, 754 (also, see FIGS. 3 and 4 for further discussion of SDR interactions and use of Diameter as a base protocol). Within the service layer 710, the service detail record (SDR) 714 defines an XML-based framework for communicating contextual security, identity (e.g., authentication, entitlements, and attribute), policy, and contextual services information between network entities, e.g., between operators/service providers 712, 718 (with only two being shown for simplicity of explanation but numerous such operators and/or providers existing in a more typical implementation of a system 700).

The SDR 714 and its use promotes interoperability between disparate networks, e.g., those run by operators 712, 718 (and which is intended to be illustrated by the two "parallel" portions of system 700 in each layer 710, 740, 760) by providing the framework for secure mobility of services across carrier boundaries. By abstracting away from the particulars of different service infrastructures (e.g., HLR, HSS, SSP, and the like), the use of SDRs 714 makes possible the dynamic integration necessary in today's constantly changing telecommunications environments. The parameters in the SDR 714 are provisioned and/or propagated to the control and network layers 740, 760 by extending the SDR framework via the Diameter Base Protocol framework to the IMS components including the HSS 742, 756 and CSCF 746, 754 (whose operations and functions were discussed in detail with reference to FIGS. 1-6).

To more fully explain implementation of a services mobility management system, such as system 700, and use of SDRs, it may be useful to provide a relatively simple SDR usage scenario or example. For example, a subscriber may live in Palo Alto, Calif. and subscribe to a service, e.g., a "push to conference" service, that is available from her operator/carrier in her home service area (proximity to Palo Alto). The subscriber wants to be able to use the "push to conference" service while they are traveling, and the use of SDR allows such seamless mobility of not just subscribers but of their subscribed to services. In New York City, N.Y., the subscriber's mobile phone is authenticated and authorized so that she can make mobile phone calls, but she further wants to be able to use her "push to conference" service and preferably at no additional cost when compared to using the service at her home area. Under implementations of the present invention, the subscriber does not need to know if the service is typically offered by the operator/carrier she is connecting to in New York City, but, instead, simply requests the service and it is provided via the New York City carrier/operator communicating via SDRs with the Palo Alto carrier/operator (e.g., as shown in the system 700 of FIG. 7).

The following is a discussion of a method of providing seamless mobility for services with reference to the above usage scenario and FIG. 7 with the Palo Alto operator being operator/service provider 712 and the New York City operator being operator/service provider 718. The method begins with the first operator 712 publishing/deploying a service (i.e., the "push to conference" service) and publishing a related SDR 714. The SDR 714 for the service may be published to a service registry 730 (such as a UDDI database or LDAP directory (as shown in FIG. 7)) of a second service provider 718 (as well as to the first service provider's service registry 720). There is typically a contractual relationship to share services established at this time or previously between the first and second service providers 712, 718 via an XML framework 715, 719.

The SDR is then provisioned to the IMS application servers 722, 732 of the first and second operators such as via an XML framework or the like, e.g., as shown by SDRs 724, 726, 734, 736 in J2EE and JSLEE platforms of the AS servers 722, 732. The SDR for the "push to conference" service is then also provisioned to the network components HSS and CSCF 742, 746, 754, 756 by the IMS AS 722, 732 (such as via Diameter servers 742, 756 or the Diameter Base Protocol Framework). At this point in the method, the service has been deployed and "made ready" to be subscribed to when a subscriber from the first operator 712 roams into the network provided by the second operator 718 (as shown by subscriber device 764 roaming to a second location as shown by subscriber device 766 to access network 762).

In practice, this means that the Proxy-CSCF (P-CSCF) 754 of the second operator 718 will make all the necessary checks to ensure QoS can be maintained for the service represented by SDR 714 within the new network. The SDR will also have the facility to note the target/new network QoS so that the appropriate billing "adjustments" can be made based on any new QoS levels. The SDR instantiation will also allocate the necessary network transport resources updating the SDR with the orchestration of network elements and enablers and pass this back to the IMS application servers 722, 732. The SDR service building block (or SBB) 724, 734 in the service layer 710 will be updated with the particular signaling and transport requirements so that when the service is actually activated by a subscriber via device(s) 766 the SDR will be aware of the network resources and be able to trigger a billing event/revenue share back to the first operator 712 and its content providers.

The method continues with the HSS 756 of the second operator 718 authenticating and authorizing the service requested by the roaming subscriber 766 on its respective network 762 at the particular, acceptable QoS for the second operator's network 762. HSS 756 in the second operator's network now has access to the particular enablers that comprise the service, which was originally provisioned by the first operator. Significantly, the S-CSCF 754 of the second operator 718 can and will communicate via SIP to the S-CSCF 746 of the first operator 712 to execute the service in the first operator's network 762 but deliver it over the second operator's network when a subscriber from the first carrier or operator 712 roams into the second carrier or operator's network 762. The second operator's IMS AS 732 and P-CSCF 754 coordinated by the SDR for the service are now able to access all enablers and service logic for the service (i.e., "push to conference").

In summary, the method allows a subscriber from a first network to roam into a second network, and when they try to use, for example, their voicemail, "push to conference," or other service corresponding to a published and provisioned SDR, the HSS of the second network knows that this particular requested service is really available from the first network but can execute successfully on the second network (within the already defined QoS parameters because the service was already authenticated and authorized on its own network, i.e., the first network). When the subscriber from the first operator or network gets authenticated and authorized via the usual HSS process, the HSS is aware of the services the subscriber can use on its own network (i.e., by combining subscriber identity with the unique services identity features of the invention) and communicates to the P-CSCF that the subscriber is trying to activate a particular requested service. The P-CSCF provides access control to the service and is aware of the service orchestration necessary to fulfill this roaming subscriber's request at the agreed upon QoS based on the SDR. The P-CSCF also generates a billing event to the subscriber and the carrier via the SDR back to the service layer, thereby allowing intercarrier billing and non-repudiation via the underlying XML framework.

As will be appreciated from the above system and method descriptions, there are a number of reasons why use SDRs to provide seamless mobility to subscribers is very important. A key consideration in a telecommunication network is the directory of services and their identity. It is not important just to provide identity of subscribers but also to provide identity of services themselves, which brings the global significance of "identity" in the core telecommunications network. Each subscriber to a service wants the services to which they subscribe to follow them to whatever network they travel to while also operating on their device(s) in a predictable and seamless manner. Using SDRs to identify services, service providers are able to focus on delivering quality content and services to wherever the subscriber is (i.e., mobility management), bill for them, and management revenue share with their key strategic partners. Licensing and digital rights management (DRM) models become increasingly relevant to managing revenue and ensuring non-repudiation capabilities.

The extensible design of the SDR can be used to facilitate DRM models for further adding value to revenue settlement with content providers and provide incremental copyright protection. In ubiquitous "Next Generation Networks," it is highly likely that federated services and DRM will become mandatory or at least much more desirable. The use of the SDR and other features of the invention will become even more useful. Communications service providers have been preparing for the next generation networks and integration of new services over CDMA, GSM, WiFi, WiMAX, wireline, cable and broadband (xDSL, DSL) service providers. Each of these technologies will have their play and niches in these next generation networks. For each of the technologies, the underlying infrastructures supporting them must be modular consistent, and standard based and the SDR fits these requirements. Challenges will include: provisioning the same service across variant network technologies seamlessly and securely billing ensuring content delivery and non-repudiation, protection of intellectual property protection through a transferable and portable mechanism, encapsulation of DRM information, and new service provider models for new entrants such as a micro services providers. As discussed in this description, the SDR and other features of the invention support existing and anticipated architectural infrastructure, transport models and existing models for rights management, billing, and service management seamlessly across disparate networks. One of the goals of using the SDR and other portions of the invention is to produce mechanisms for rights management for content and service protection as well as serviceability for the new eco-system of micro-providers.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Significantly, the above examples of implementing SDRs showed their usefulness in a telecommunications environment in which users are traveling from one telecommunication network to another. However, the use and concept of the SDRs described herein is not limited to the telecommunications environment but are intended for use in other implementations.

Specifically, SDRs may be used in nearly any system or network where it is desirable to provide services across a distributed computing system or network(s). For example, SDRs can be used to provide services identity in the utility computing domain so that the services can be processed or accessed in different data center computing domains, whereby seamless processing in the utility computing model can be obtained. In this implementation of the invention, elements of the SDR may be applied to standard data processing where one service executes in a different computing center or system or on another processor. In this scenario, the SDR interacts in subsystems that give the similar HSS and CSCF-type functionality in the utility computing domain, e.g., the description of the telecommunications implementation remains applicable above the transport and control layer as shown in FIG. 7.

I claim:

1. A method for enhancing mobility of a subscriber in a telecommunications environment, comprising:

with a first network operator, deploying a service accessible by a subscriber via a first network associated with a first network operator;

creating a service detail record comprising information related to an identity of the service;

publishing the service detail record in a service registry accessible by a second network operator operating a second network; and with the second network operator, receiving over the second network a request from the subscriber for the service and in response, processing the service detail record and based on the processing, providing the service to the subscriber via the second network, wherein the providing of the service to subscriber comprises executing the service on the first network using resources of the first network.

2. The method of claim 1, further comprising creating a subscriber profile defining an identity of the subscriber including access rights of the subscriber to the service and further comprising prior to the providing of the service, authorizing the subscriber based on the subscriber profile.

3. The method of claim 1, wherein the providing of the service by the second network operator comprises updating the service detail record to include billing information and wherein the method further comprises returning the updated service detail record with the billing information to the first network operator.

4. The method of claim 1, wherein the service detail record information comprises at least one of: originating network, terminating network, service enable identification, length of time the service has been invoked, quality of service requirements (QoS), time of day, service deployment and activation data, subscriber data to allow network operators to engage and fulfill a business transaction, contextual information, copyright protection parameters, and digital rights management (DRM) parameters.

5. A method for managing seamless mobility of a subscriber in a telecommunications environment, comprising:
- receiving a service detail record from a first operator system over a digital communications network, the service detail record comprising information defining a service deployed in the first operator system including identifying network resources in the first operator system allocated to the deployed service;
- storing the received service detail record in a service registry accessible by an application server of a second operator system;
- first provisioning the service detail record to the application server;
- second provisioning the service detail record to a home subscriber server of the second operator system;
- receiving a request from a subscriber for the service defined by the provisioned service detail record over an access network to a core telecommunications network associated with the second operator system; and
- using the service detail record operating the home subscriber server of the second operator system to provide the service to the requesting subscriber of the access network.

6. The method of claim 5, further comprising third provisioning the service detail record to a call/session control function server of the second operator system and prior to the using of the service detail record, performing checks of the second operator system with the call/session control function server to determine if a quality of service defined in the service detail record can be maintained in the second operator system.

7. The method of claim 5, wherein the using of the of the service detail record comprises operating the home subscriber server of the second operator system to access a set of enablers of the service in the first operator system as defined in the service detail record and to use the allocated network resources to execute the service on the first operator system or if the set of enablers are available in the second operator system to execute the service on the second operator system.

8. The method of claim 5, wherein the service detail record information additionally comprises at least one of: originating network, terminating network, service enabler identification, length of time the service has been invoked, quality of service requirements (QoS), time of day, service deployment and activation data, subscriber data to allow network operators to engage and fulfill a business transaction, and contextual information.

9. The method of claim 5, further comprising accessing a subscriber profile defining an identity of the requesting subscriber and authorizing the subscriber based on the subscriber profile as having access rights to the service after the receiving the request from the subscriber.

10. The method of claim 5, wherein the using comprises updating the service detail record with usage data based on the providing of the service and transmitting the updated service detail record to the first operator system, whereby billing functions in the first operator system are supported.

\* \* \* \* \*